United States Patent
Chang et al.

(10) Patent No.: US 10,474,584 B2
(45) Date of Patent: Nov. 12, 2019

(54) STORING CACHE METADATA SEPARATELY FROM INTEGRATED CIRCUIT CONTAINING CACHE CONTROLLER

(75) Inventors: Jichuan Chang, Sunnyvale, CA (US); Justin James Meza, Pittsburgh, PA (US); Parthasarathy Ranganathan, San Jose, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 883 days.

(21) Appl. No.: 13/459,994

(22) Filed: Apr. 30, 2012

(65) Prior Publication Data
US 2013/0290607 A1  Oct. 31, 2013

(51) Int. Cl.
*G06F 12/08* (2016.01)
*G06F 12/02* (2006.01)
*G06F 12/0895* (2016.01)
*G06F 9/38* (2018.01)
*G06F 3/06* (2006.01)

(52) U.S. Cl.
CPC ........ *G06F 12/0895* (2013.01); *G06F 9/3842* (2013.01); *G06F 3/0667* (2013.01); *Y02D 10/13* (2018.01)

(58) Field of Classification Search
CPC .... G06F 17/301; G06F 3/0667; G06F 9/3842; G06F 17/30743
See application file for complete search history.

(56) References Cited

U.S. PATENT DOCUMENTS

| | | | | |
|---|---|---|---|---|
| 5,627,992 A * | 5/1997 | Baror | ................... | G06F 12/0837 711/133 |
| 5,787,467 A * | 7/1998 | Abe | .............................. | 711/118 |
| 5,860,106 A * | 1/1999 | Domen | ............... | G06F 12/0215 365/227 |
| 6,226,722 B1 * | 5/2001 | Shippy | ................ | G06F 12/0884 711/168 |
| 6,556,477 B2 | 4/2003 | Hsu et al. | | |
| 6,993,617 B2 | 1/2006 | Butcher et al. | | |
| 7,243,192 B2 | 7/2007 | Taylor et al. | | |
| 7,987,407 B2 * | 7/2011 | Gille | ..................... | G06F 11/141 714/20 |
| 8,984,048 B1 * | 3/2015 | Maniscalco et al. | ......... | 709/203 |
| 9,104,582 B1 * | 8/2015 | Mukundan et al. | | |

(Continued)

OTHER PUBLICATIONS

Zhao et al., "Exploring DRAM Cache Architectures for CMP Server Platforms", In the Proceedings of the 25th International Conference on Computer Design (ICCD), 2007, pp. 55-62.

(Continued)

*Primary Examiner* — Charles Rones
*Assistant Examiner* — Tian-Pong Chang
(74) *Attorney, Agent, or Firm* — Trop, Pruner & Hu, P.C.

(57) ABSTRACT

A technique includes using a cache controller of an integrated circuit to control a cache including cached data content and associated cache metadata. The technique includes storing the metadata and the cached data content off of the integrated circuit and organizing the storage of the metadata relative to the cached data content such that a bus operation initiated by the cache controller to target the cached data content also targets the associated metadata.

22 Claims, 3 Drawing Sheets

(56) References Cited

U.S. PATENT DOCUMENTS

| | | | |
|---|---|---|---|
| 2003/0046493 A1* | 3/2003 | Coulson | 711/118 |
| 2004/0024941 A1* | 2/2004 | Olarig | G06F 13/4081 710/302 |
| 2006/0090039 A1* | 4/2006 | Jain et al. | 711/137 |
| 2007/0106847 A1* | 5/2007 | Bonwick et al. | 711/133 |
| 2009/0217273 A1 | 8/2009 | Mutlu et al. | |
| 2010/0106895 A1* | 4/2010 | Condit | G06F 12/0804 711/103 |
| 2010/0169519 A1 | 7/2010 | Zhang et al. | |
| 2011/0131366 A1* | 6/2011 | Nakai | G06F 12/0246 711/103 |
| 2012/0017062 A1 | 1/2012 | Goel et al. | |
| 2013/0198448 A1* | 8/2013 | Ish | G06F 12/0871 711/113 |
| 2013/0254457 A1* | 9/2013 | Mukker et al. | 711/103 |
| 2013/0290676 A1* | 10/2013 | Aggarwal | G06F 1/3243 712/205 |
| 2014/0201446 A1* | 7/2014 | Steeley, Jr. | G06F 12/0808 711/121 |

OTHER PUBLICATIONS

Wenisch et al., "Practical off-chip meta-data for temporal memory streaming", IEEE 15th International Symposium on High Performance Computer Architecture, 2009, 12 pages.

Verghese et al., "Effectiveness of off-chip caches for commercial applications", In Workshop on Scalable Shared Memory Multiprocessors, 1999, 14 pages.

Raoux et al., "Phase-change random access memory: A scalable technology", IBM Journal of Research and Development, vol. 52, Issue 4, Jul. 2008, pp. 465-479.

Ramos et al., "Page placement in hybrid memory systems", ICS '11 Proceedings of the international conference on Supercomputing, 2011, pp. 85-95.

Qureshi et al., "Scalable high performance main memory system using phase-change memory technology", ISCA '09 Proceedings of the 36th annual international symposium on Computer architecture, 2009, pp. 24-33.

Micron Technology, Inc., "Hybrid Memory Cube", (webpage), available online at <https://web.archive.org/web/20111219104028/http://www.micron.com/innovations/hmc.html>, 2011, 2 pages.

Lee et al., "Architecting phase change memory as a scalable dram alternative", ISCA '09 Proceedings of the 36th annual international symposium on Computer architecture, vol. 37, No. 3, 2009, pp. 2-13.

Jouppi, Norman P., "Improving direct-mapped cache performance by the addition of a small fully-associative cache and prefetch buffers", Proceedings. The 17th Annual International Symposium on Computer Architecture, 1990, pp. 364-373.

Jiang et al., "Chop: Adaptive filter-based dram caching for cmp server platforms", In HPCA, 2009, 12 pages.

Gharachorloo et al., "Efficient ecc-based directory implementations for scalable multiprocessors", Presented at the 12th Symposium on Computer Architecture and High-Performance Computing, Oct. 2000, 8 pages.

Dong et al., "Simple but effective heterogeneous main memory with on-chip memory controller support", In Supercomputing, 2010, pp. 1-11.

Dhiman et al., "PDRAM: A hybrid pram and dram main memory system", DAC '09 Proceedings of the 46th Annual Design Automation Conference, 2009, pp. 664-469.

Cvetanovic et al., "Alphaserver 4100 performance characterization", Digital Technical Journal, vol. 8, No. 4, 1996, pp. 3-20.

A. Seznec, "Decoupled Sectored Caches: Conciliating Low Tag Implementation Cost and Low Miss Ratio", Proceedings of 21 International Symposium on Computer Architecture, 1994, pp. 384-393.

A. Seznec, "A case for two-way skewed-associative caches", ISCA '93 Proceedings of the 20th annual international symposium on computer architecture, vol. 21, Issue 2, 1993, pp. 169-178.

* cited by examiner

US 10,474,584 B2

STORING CACHE METADATA SEPARATELY FROM INTEGRATED CIRCUIT CONTAINING CACHE CONTROLLER

BACKGROUND

A memory cache typically refers to a relatively smaller and faster memory that stores copies of frequently accessed data that is stored in a relatively larger and slower main memory. Memory access times may therefore reduce due to the memory cache because frequently accessed data is available via the memory cache instead of through slower accesses to the main memory.

The memory cache typically is part of a cache system that includes a cache controller, which regulates which data is stored in the memory cache. When a processing entity attempts to access a given address, or location, in the main memory, the cache controller determines whether a copy of the corresponding data is stored in the cache, i.e., the cache controller determines whether a "cache hit" occurs. If a cache hit occurs and the cache controller determines that the corresponding data that is stored in the memory cache is valid, then the cache memory effectively services the processing entity's request.

Due to its relatively small size relative to the main memory, the memory cache typically stores a limited number of blocks, which, in general, correspond to the most frequently accessed blocks of the main memory. A fully associative cache system does not restrict the mapping of its blocks to blocks of the main memory, as any block of the cache memory may, in general, be mapped to any location of the main memory. In contrast, a direct mapped cache system constrains its blocks to store data for selected blocks of the main memory. The cache may employ other associative schemes for purposes of mapping blocks of the cache memory to blocks of the main memory.

DETAILED DESCRIPTION

Figure 1:
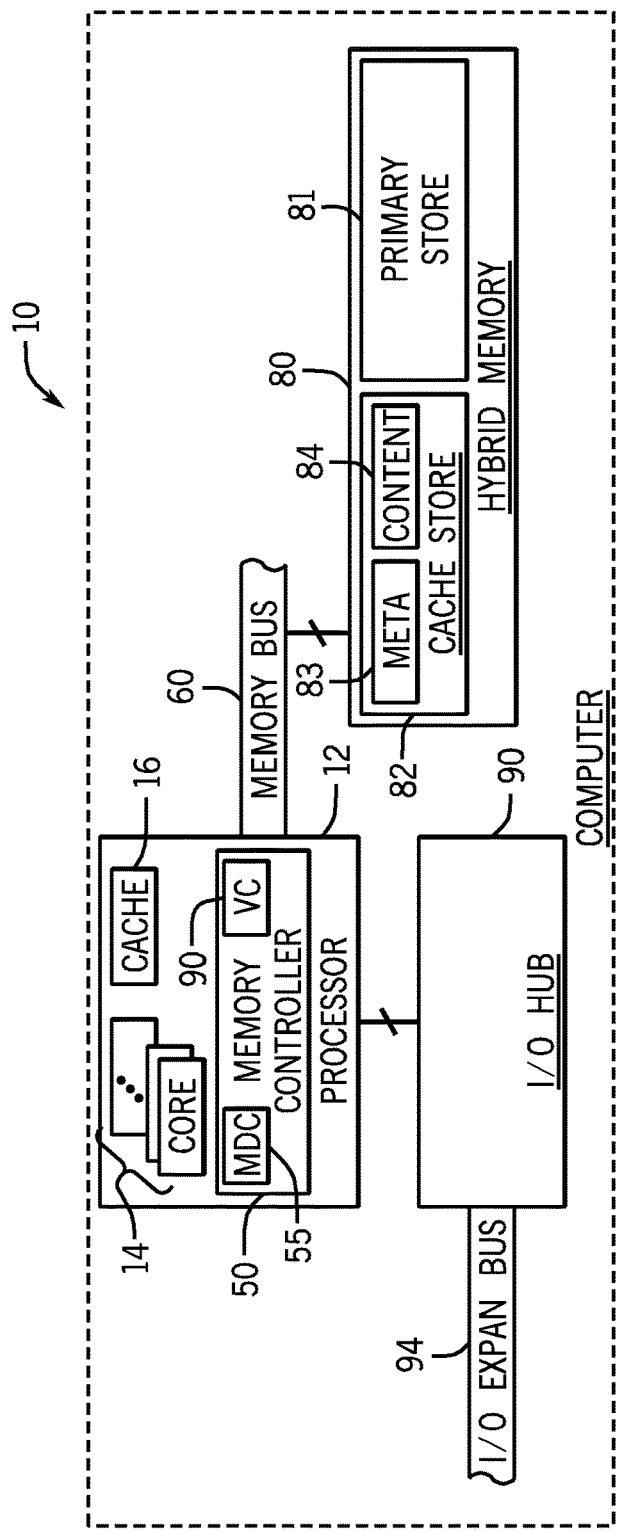
FIG. 1 is a schematic diagram of a computer system according to an example implementation.

Referring to FIG. 1, in accordance with example implementations, a computer 10 (a server, a client, a desktop computer, a thin client, a portable computer or a smartphone, as a few examples) includes a hybrid memory 80 that is formed from non-volatile memory devices (flash memory devices, phase change memory devices, or memristor memory devices, as a few non-limiting examples) and/or volatile memory devices (dynamic random access (DRAM) memory devices, as an example). In accordance with example implementations, the non-volatile memory devices of the hybrid memory 80 form a main memory (herein called a "primary store 81") of the computer 10; and the volatile memory devices are part of a cache system of the computer 10. More specifically, the volatile memory devices form a store 82 (herein called a "cache store 82") to store cached data for the primary store 81.

In general, the volatile memory devices of the cache store 82 are associated with faster access times than the access times of the non-volatile memory devices; but the volatile memory devices of the primary store 81 retain data when the computer 10 is powered off.

In accordance with example implementations, the cache store 82 is a relatively "fine grained" cache memory in that a cache block size of the cache store 82 may be relatively small (128 byte blocks, as a non-limiting example), as compared to a relatively larger cache block size (a 4 kilobyte (KB) block size, for example) that may be employed by a relatively coarser grained cache memory system. A smaller cache block granularity may have a profound positive effect on spatial locality, bandwidth consumed between the primary store 81 and the cache store 82 and data sharing behavior in general.

A smaller cache block size is also associated with more cache metadata (data such as validity bits, dirty bits, cache coherency bits, cache tags, error correction code (ECC) bits, and so forth). For example, to cache an eight gigabyte (GB) DRAM module using a 128 byte cache block size, the corresponding cache metadata size may be on the order of 240 Megabytes (MB). It may be relatively challenging to accommodate such a relatively large cache metadata size in a traditional tag memory (a static random access memory (SRAM), for example) that is disposed on the same integrated circuit as the cache controller which is typically integrated with processor chips. Moreover, it may be relatively challenging to provide the flexibility in a cache tag memory for different cache block sizes and configurations due to the cache metadata size that is associated with a relatively fine grained cache memory.

For purposes of accommodating a relatively fine grained cache memory (and an associated relatively large cache metadata size), example systems and techniques are disclosed herein, which store cache metadata 83 "off chip" relative to a cache controller of the cache memory system. In this manner, as further disclosed herein, the cache metadata 83 may be part of the cache store 82, which is stored in a volatile memory space (formed from the volatile memory devices of the cache store 82). The volatile memory space, in turn, has a size (a volatile memory formed from one or multiple memory modules, for example) that is sufficiently large enough to store the relatively large size of the cache metadata 83, as well as store cached data content 84.

For example implementations that are disclosed herein, the cache controller is formed as part of a system memory controller 50. Aside from its various functions as a cache controller, the system memory controller 50 also controls read and write accesses to the primary store 81 based on the caching policy (e.g., where to insert blocks into the cache, how many blocks to insert, what blocks to replace in the cache, and so forth).

In general, the memory controller 50 responds to memory access requests (initiated by a processor 12, for example, or other components of the computer 10) and controls access to the hybrid memory 80 accordingly by initiating the appropriate read and write cycles on a memory bus 60. Thus, for example, in response to a given memory request by the processor 12, the memory controller 50 controls whether the request is fulfilled in a process that involves accessing the cache store 82 and/or accessing the primary store 81. Either way, the memory controller 50 generates the appropriate cycles on the memory bus 60.

Although the memory controller 50 accesses the cache metadata 83 over the memory bus 60 (instead of accessing the cache metadata on chip, for example), techniques and systems are disclosed herein to mitigate performance penalties that may be incurred due to the off chip metadata accesses by the controller 50 to provide a cache system that has a flexible and adaptive granularity, while balancing this flexible and adaptive granularity with bandwidth contention concerns.

More specifically, systems and techniques are disclosed herein for purposes of organizing the storage of the cache metadata 83 relative to the cached data content 84 within the cache store 82 so that a given operation on the memory bus 60 (a read operation, for example) that targets the cached data content 84 also consequently targets the associated cache metadata 83.

For example, a read operation to read a given block (a row, for example) of cached content data 82 from the cache store 82 also consequently retrieves the associated cache metadata 83 for the cached content data content 84 due to the cache metadata 83 being stored in the same block in the cache store 82.

In the context of this application, a "chip," or "integrated circuit," refers to circuitry within the same semiconductor package, regardless of whether the semiconductor package includes a single die or multiple dies or whether the circuitry is formed on a single die or on multiple dies of the same semiconductor package. As depicted in FIG. 1, in accordance with example implementations that are disclosed herein, the memory controller 50 is part of a semiconductor package (a processor or bridge chipset chip, for example) other than the semiconductor package(s) (DRAM module(s), for example) of the cache store 82. For the specific example of FIG. 1, the processor 12 is contained in a single semiconductor package and contains the memory controller 50.

In general, the computer 10 is a "physical machine," or an actual machine that is made up of machine executable instructions and hardware. Although the computer 10 is represented in FIG. 1 as being contained within a box, the computer 10 may be a distributed machine, which has multiple nodes that provide a distributed and parallel processing system. In accordance with some implementations, the physical machine may be located within one cabinet (or rack); or alternatively, the physical machine may be located in multiple cabinets (or racks).

The processor 12, the memory controller 50 and the memory devices that form the hybrid memory 80 are examples of hardware components of the computer 10. Although a single processor 12 is depicted in the simplified schematic of the computer 10 in FIG. 1, the computer 10 may include multiple processors 12, in accordance with some implementations. As examples, the processor 12 may be a microprocessor (central processing unit (CPU), for example) or microcontroller and may include one or multiple processing cores 14, as well as at least one cache 16 that is separate from the cache system formed from the memory controller 50 and cache store 82. As an example, the processor 12 may contain hierarchically-arranged caches, such as a level one (L1) cache, a level two (L2) cache and a level three (L3) cache.

For operations that target addresses, or locations, of the primary store 81, a processor 12 of the computer 10 generates requests to be handled by the memory controller 50.

As depicted in FIG. 1, the memory controller 50 is an interface for the memory bus 60, potentially integrated with other interfaces (not shown) for other buses (a graphics bus, one or more input/output (I/O) expansion buses, and so forth) of the computer 10.

In accordance with some implementations, the computer 10 includes an I/O hub 90, which communicates with the processor 12 and may contain various interfaces for purposes of communication with one or more I/O expansion buses 94, hard disk drives, input devices, serial communication links, and so forth.

As further disclosed herein, in accordance with example implementations, the cache store 82 and memory controller 50 are constructed to employ either a direct-mapped cache organization or set-associative cache organization, which permits off chip cache metadata 83 and cached content 84 accesses by the memory controller 50 to be combined, or streamlined. For purposes of enhancing the performance of the cache system, the memory controller 50 may contain one or multiple on chip caches.

In this manner, in accordance with some implementations, for purposes of effective associativity of the cache system, the memory controller 50 contains an on chip victim cache 90. The victim cache 90 is operatively disposed between the cache store 82 and its refill path for purposes of storing blocks that are evicted from the cache store 82 due to the replacements of these blocks. The victim cache may be a fully associative cache, in accordance with some implementations.

The memory controller 50 may include an on chip metadata cache 55, in accordance with some implementations. The metadata cache 55 permits the memory controller 50 to perform "zero cycle" cache tag access without other incurring performance penalties that may otherwise be incurred due to off chip cache tag access. In this manner, performance penalties that may be avoided using the metadata cache 55 may include latency and bandwidth penalties incurred by off chip tags lookup and updates; delayed access to the primary store 81 for cache store 82 misses; tag-fetched row buffer locality disruptions; and so forth. In general, the on chip metadata cache 55 accelerates tag accesses by caching the cache metadata for recently-accessed rows of the cache store 82.

Figure 2:
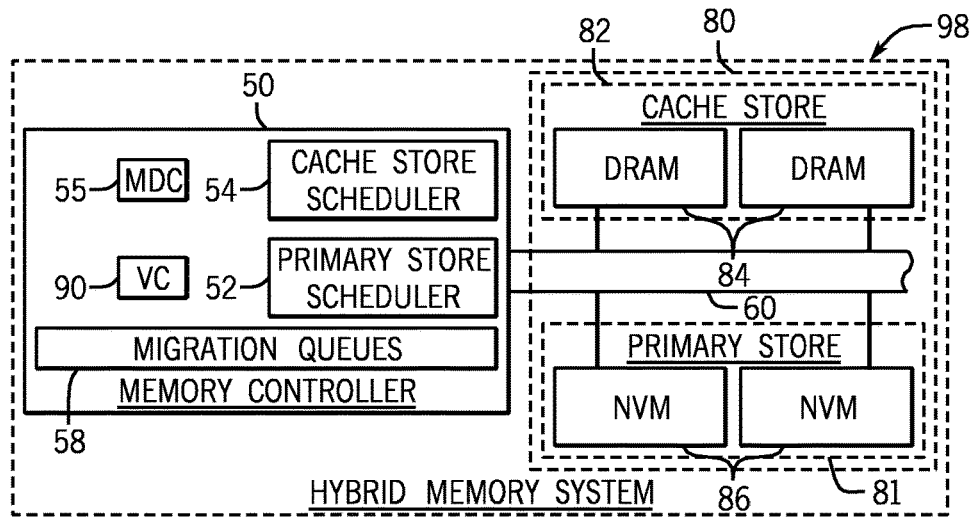
FIG. 2 is a schematic diagram of a hybrid memory system according to an example implementation.

FIG. 2 illustrates a hybrid memory system 98 used by the computer, in accordance with some implementations. Referring to FIG. 2 in conjunction with FIG. 1, in general, the hybrid memory system 98 includes the memory controller 50 and the hybrid memory 80, which, in turn, includes the cache store 82 and the primary store 81. For this example, the cache store 82 is formed from one or multiple DRAM memory modules 84 that are coupled to the memory bus 60; and the primary store 81 is formed from non-volatile memory modules 86. The memory controller 50 includes primary store 52 and cache store 54 schedulers, which are each coupled via the memory bus 60 or separate memory channels to their corresponding off-chip memory modules. In general, the primary store scheduler 52 schedules requests for accessing the primary store 81, and the cache store scheduler 52 schedules requests for accessing the cache store 82.

As depicted in FIG. 2, the memory controller 50 may further include migration queues 58. During the normal course of operation of the cache system, data migrates between the primary 81 and cache 82 stores, and the migration queues serve as temporary data storage buffers for this migrating data while requests are pending to store the data in the target memory.

In general, the memory controller 50 may service a given memory request from one of three entities: the primary store 81, the cache store 82 and the migration queues 58. By tracking in-flight migrations and checking the cache metadata 83 that is stored in the cache store 82, the memory controller 50 may determine the appropriate location to service each memory request. In accordance with some implementations, the primary store 52 and cache store 54 schedulers service requests that target the primary store 81 and the cache store 82 based on a First-Ready First-Come First-Serve (FR-FCFS) policy and service requests that are awaiting the arrival of in-flight data arriving in the migration queues 58 based on data availability and other relevant criteria such as request criticality, etc.

The hybrid memory system 98 supports a relatively fine-grained cache block size, which may be the same cache block size of the last level cache 16 of the processor 12, in accordance with some implementations. Such a fine cache granularity reduces memory bandwidth consumption related data migration between the cache store and the persistent store, especially for workloads that consistently reference a few "hot blocks" within a large page. On the other hand, for workloads that prefer a larger granularity, the hybrid memory system 98 retains the flexibility to support multi-block migrations and may therefore achieve the same spatial locality benefits. In accordance with some implementations, for each data block cached in the cache store 82 (i.e., for each block of the cached data content 84 in FIG. 1), the hybrid memory 98 stores the metadata for the block within the cache store 82 to eliminate a relatively expensive and fixed sized on-chip tag store.

The cache metadata 83 and the cached data content 84 may be organized for purposes of streamlining their access in one of many different ways, depending on the particular implementation. As a non-limiting example, in accordance with some implementations, the cache metadata 83 may be embedded in error correction code (ECC) bits for the cached data content 84.

Figure 3:
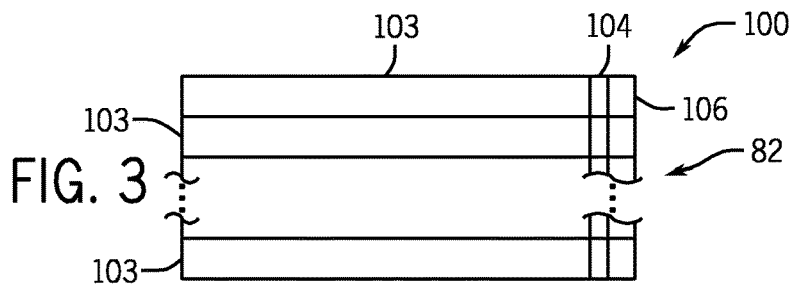
FIG. 3 depicts an exemplary organization of cache content and associated metadata stored in a common memory row line according to an example implementation.

More specifically, as a non-limiting example, FIG. 3 depicts an organization 100 for the cache store 82, in accordance with some implementations. In general, pursuant to the organization 100, cache blocks 103 (indicative of cache data content) are stored in the cache store 82 contiguously with corresponding error correction code (ECC) bits 104 and 106. Thus, a given cache block 103 has an associated set of ECC bits 104 and 106.

The ECC bits 104 may be used to detect and correct errors in the given cache block 103, and the ECC bits 106 may be used to encode the associated cache metadata 83 for the block 103. The cache block 103 and ECC bits 104 and 106 may be part of the same row; and as such, the cache block 103 and ECC bits 104 and 106 are accessed by the same read/write operation.

As a non-limiting example, eight ECC bits may be used to protect a given sixty-four data segment of cached content. Based on the ECC's mathematical properties, doubling the data segment into one hundred twenty eight bits uses one more ECC bit, thereby allowing unused check bits for metadata storage. Thus, for the example depicted in FIG. 3, a given cache block 103 includes ten checker bits 106 to protect the one hundred twenty eight cache block 103 as well as metadata bits 104 to encode the associated metadata. In certain implementations, for one hundred twenty eight byte DRAM blocks, forty-eight bits of ECC memory may be used for metadata storage.

Due to the cache metadata 83 being embedded in the ECC bits, the metadata is transferred simultaneously with its associated cache block over the memory bus 60 in the same operation (a burst operation, for example). Thus, because the ECC bits are transferred simultaneously with the cache data block, the metadata may be relatively easily accessed without incurring additional latency or involving memory contention.

Figure 4:
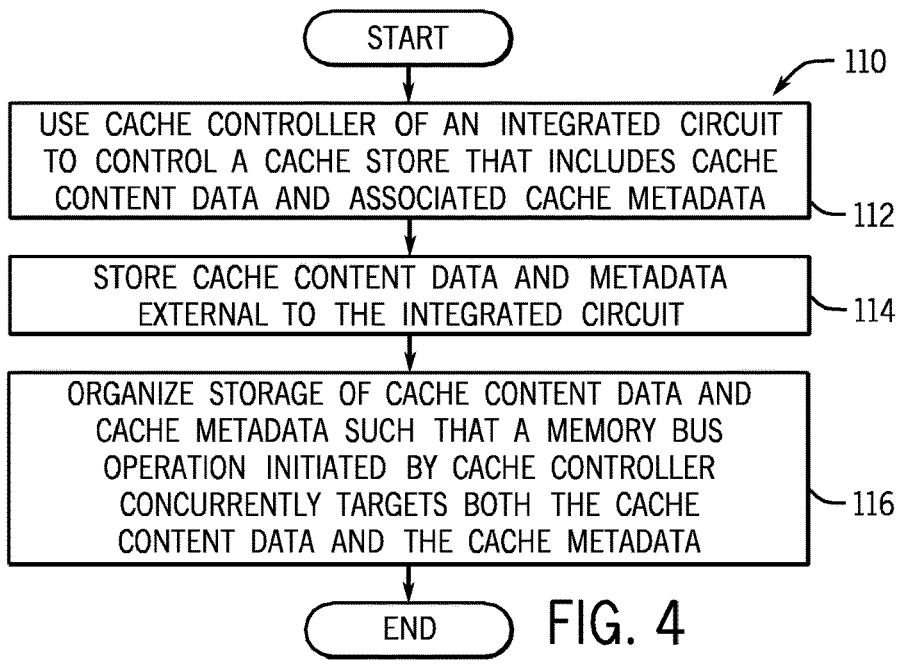
FIG. 4 is a flow diagram depicting a technique to use and organize cache metadata according to an example implementation.

Thus, in general, a technique 110 that is depicted in FIG. 4 may be used for purposes of using off-chip cache metadata. Pursuant to the technique 110, a cache controller of an integrated circuit is used (block 112) to control a cache store that includes cache content data and associated cache metadata. The metadata and cache content data are stored (block 114) external to the integrated circuit. The storage of the metadata and cache content data is organized (block 116) such that a memory bus operation (i.e., an operation that occurs over the memory bus 90) that is initiated by the cache controller concurrently targets both the cache content and the metadata.

The cache data content 84 and its associated cache metadata 83 may be organized differently to allow their concurrent access, in accordance with further implementations. For example, for implementations in which the DRAM modules 84 (FIG. 2) are non-ECC DRAM modules, the cache metadata may be stored in the same row as the associated cache data content.

Figure 5:
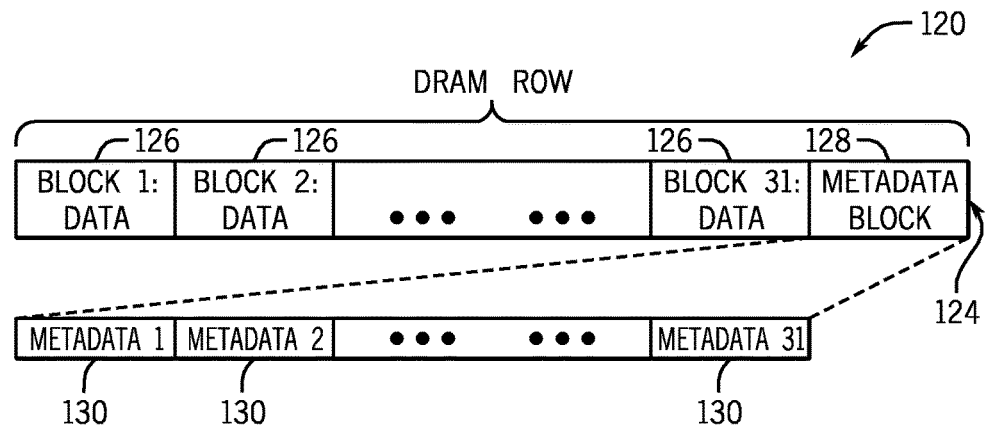
FIG. 5 depicts the encoding of cache metadata in error correction code bits for the cache data according to an example implementation.

As a more specific example, FIG. 5 depicts an organization 120 in which a metadata block 128 is stored "inline," or in the same row 124, with corresponding cache content blocks 126. The metadata block 128, in turn, stores all of the associated cache metadata for the cache blocks 126 in the row 124, amortizing the required metatransfer bandwidth and enhancing spatial locality for metadata accesses. The aggregated metadata block 128 satisfies all metadata lookup and update requests for the row 124.

The collocation of the cache metadata block 128 with the associated data blocks 126 favors a direct-mapped or set-associative cache organizations because, for a given data row 124, there is corresponding cache frame (or cache "block") to store it and correspondingly one metadata location to access. It is noted that highly set associative or fully associative caches allow one data block to be stored in multiple possible locations but, in the worst case, use multiple tag lookups.

Therefore, the direct-mapped or set-associative organizations may be particularly advantageous, as such organizations employ a single tag lookup. Although the such cache organizations limit the possible locations in which the data block can be stored, their performance may be mitigated by one or more multiple features of the cache memory system, such as the on chip victim cache 90 (FIG. 1) and the on chip metadata cache 55 (FIG. 1).

Although a fully-associative cache organization may have certain advantages when the workload has temporal locality across many address-conflicting streams, the relatively large on-chip cache(es) 16 (see FIG. 1) of the processor 12, may effectively capture such access patterns, especially if the computer 10 is a relatively powerful server system. For direct-mapped and set-associative cache organizations, a minimal slowdown occurs with a sixteen-way associative cache organization with an idealized, zero cycle on-chip tag store.

For the above-described aggregated metadata block implementation of FIG. 5, one cache frame per DRAM row is occupied by metadata, and hence, cannot be used for data block caching. The block mapping algorithm may either remap the corresponding data blocks to a different cache frame within the row or use a non-power-of-two modulo indexing functions, similar to skewed cache. As a more specific example, the data blocks may be re-mapped to a different cache frame, which has a relatively negligible performance impact, in accordance with some implementations.

Figure 6:
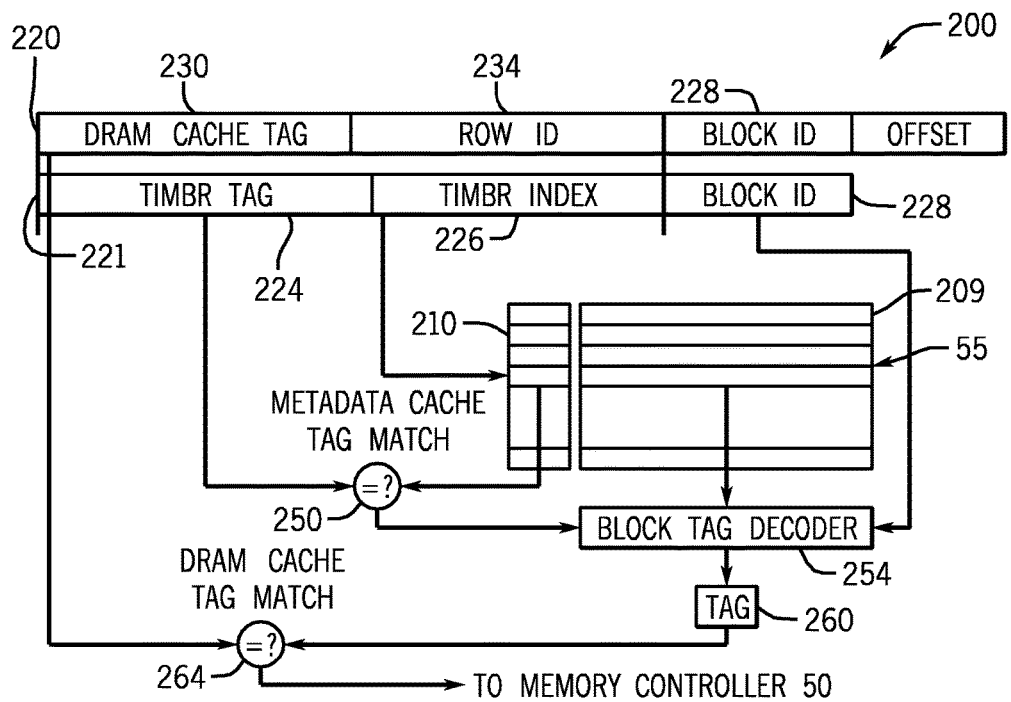
FIG. 6 is a schematic diagram illustrating the use of an on-chip metadata cache according to an example implementation.

Referring to FIG. 6 in conjunction with FIGS. 1 and 2, in accordance with exemplary implementations, the metadata cache 55 may operate as follows. In general, the metadata cache 55 accelerates tag accesses by caching the metadata for recently-used rows of the primary cache store 81, in accordance with exemplary implementations.

For the example that is depicted in FIG. 6, the memory address is depicted in two different formats, corresponding to reference numerals 220 and 221. In accordance with exemplary implementations, the metadata cache 55 includes metadata cache tags 210, which are associated with $2^N$ cache entries 209 for this example. Upon a last level cache miss, the memory controller 50 first checks the metadata cache 55 to determine whether the data is cached in the off-chip cache store 82.

Assuming that the metadata cache 55 has $2^N$ entries, the lowest N bits 226 of the missing block's row-level ID 234 are selected as the index to metadata cache 55 for purposes of identifying a corresponding metadata cache tag 210. The remaining top bits 224 from the physical address are used for tag matching comparisons. In this regard, the cache tag 210 is compared (as indicated by decision block 250) with the address bits 224 for purposes of determining whether the corresponding cache metadata is stored in the metadata cache 55.

Continuing the example, if a hit occurs in the metadata cache 55, the corresponding cache metadata entry 210 is read from the metadata cache 55 and decoded by a block tag decoder 254 (using the address's block ID 228 and the result of the comparison 250) to produce a corresponding metadata tag 260, as depicted in FIG. 6. The cache controller 56 further compares (as indicated by decision block 264) to the higher order bits of the block address, called the DRAM cache tag 230, to determine whether the associated cache data content block is cached in the cache store 82. If the tag match fails because the metadata block is not currently cached in the metadata cache 55, the memory controller 50 to initiates an operation over the memory bus 60 to retrieve the metadata block from the cache store 82 and, for victim entries with dirty data, write back a selected victim entry.

While cached in the metadata cache 55, the content of a metadata block in the cache store 82 may become outdated until the metadata cache 55 writes the metadata block back into the cache store 82. However, the cache controller 56 has the correct metadata information because metadata blocks are updated on the condition that the blocks are in the metadata cache 55.

When a demand memory request misses in the metadata cache 55, one of several different optimizations may be employed for purposes of further accelerating the data block fetch, depending on the particular implementation. For example, in accordance with an exemplary implementation, the memory controller 50 may speculatively fetch the block from the primary store 81, assuming that the block is neither stored in the cache store 82 nor has been modified in the cache store 82, while in parallel, fetch the metadata block from cache store 82. In this manner, the access to the primary store 81 may be effectively overlapped with the retrieval of the metadata tag from the cache store 82, and when the tag lookup outcome confirms the validity of the data value fetched from the non-volatile memory store 81, the memory controller 50 may directly use the available value.

In accordance with further exemplary implementations, the memory controller 50 may estimate the speculation accuracy using confidence prediction and combine the confidence prediction outcome with bandwidth throttling. Thus, the memory controller 50 may perform the speculative prefetch based at least in part on the estimation of the speculation accuracy. In this manner, the confidence prediction may decrease bandwidth contention and energy consumption, in accordance with some implementations.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
    using a cache controller to control a cache comprising cached data content and associated cache metadata, wherein the cached data content represents data content stored in a first memory, and the cache metadata comprises cache tags for the associated cached data content;
    storing the cache metadata and the cached data content in a second memory that is separate from an integrated circuit that contains the cache controller;
    generating cycles on a memory bus coupled to the first memory and the second memory to control access to the first memory and the second memory; and
    organizing the storage of the metadata relative to the cached data content such that a given cycle of the cycles generated on the memory bus targets the cached data content and also targets the associated metadata.

2. The method of claim 1, wherein the organizing comprises:
    embedding the associated metadata in error code correction data associated with the cached data content.

3. The method of claim 1, wherein memory bus operation comprises a memory bus operation targeting a row of a memory and the organizing comprises storing the metadata and the cached data in the same row of the memory.

4. The method of claim 3, wherein the cached data comprises a plurality blocks of cached data, and the metadata comprises metadata for the blocks.

5. The method of claim 1, wherein the cached data content and the metadata are stored in a volatile memory, the method further comprises using the cache controller to control the cache in response to accesses to data stored in a non-volatile memory.

6. The method of claim 1, further comprising:
    providing a metadata cache store on the integrated circuit to cache the metadata.

7. The method of claim 1, wherein the using comprises organizing the cache to employ direct mapping or set-associative schemes among data blocks and the cached content.

8. The method of claim 1, wherein generating cycles on the memory bus comprises generating the cycles in a memory controller.

9. The method of claim 1, wherein the cache metadata further comprises at least one of validity bits or cache coherency bits for the associated cached data content.

10. An apparatus comprising:
- a primary data store comprising non-volatile memory;
- a cache data store for the primary data store comprising volatile memory, wherein the cache data store comprises cached data content and cache metadata associated with the cached data content, and the cache metadata comprises cache tags for the associated cached data content;
- a memory bus coupled to the primary data store and the cache data store;
- a cache controller of an integrated circuit separate from the cache data store to initiate a bus cycle on the memory bus to concurrently target the cached data content and the associated metadata such that the non-volatile memory and the volatile memory respond to the bus cycle generated on the memory bus.

11. The apparatus of claim 10, wherein the bus operation comprises a read operation or a write operation.

12. The apparatus of claim 10, wherein the bus operation comprises a burst operation to access a row of the volatile memory.

13. The apparatus of claim 10, wherein the metadata associated with the cached data is embedded in error code correction data associated with the cached data content.

14. The apparatus of claim 10, wherein the cache data store comprises a data row formed from a plurality blocks of the cached data and a block containing the associated metadata for the blocks of the cached data.

15. The apparatus of claim 10, wherein the controller is adapted to determine whether a cache hit occurs for the cache data store in response to a request targeting the primary data store.

16. The apparatus of claim 15, wherein the cache controller further comprises another cache store, and the memory controller is adapted to use the another cache store to determine whether an associated cache content block is stored in the cache store that includes the volatile memory in response to the cache hit.

17. The apparatus of claim 16, wherein the cache controller is adapted to selectively access the associated metadata in response to a cache miss occurring for the another cache store.

18. An apparatus comprising:
- an integrated circuit comprising a cache controller, a buffer to store a pending memory access request and a first cache to store cached metadata associated with cache metadata stored in a second cache external to the integrated circuit, wherein the cache controller is adapted to, in response to the request, determine whether a cache miss occurs for the first cache and based on the determination, selectively speculatively fetch data from a primary data store external to the integrated circuit, wherein the cache metadata and the data fetched from the primary data store are arranged such that the primary data store and the second cache each furnish data in response to a memory bus cycle that targets the primary data store and the second cache.

19. The apparatus of claim 18, wherein the cache controller is further adapted to estimate a speculation accuracy and base the speculative prefetch based at least in part on the estimated speculation accuracy.

20. The apparatus of claim 18, wherein the metadata comprises a cache tag address.

21. The apparatus of claim 18, wherein the integrated circuit further comprises a victim cache to store data evicted from the second cache.

22. The apparatus of claim 18, wherein the cache controller is adapted to perform the speculative prefetch based at least in part on a confidence prediction outcome.

* * * * *